March 14, 1933.  G. AUSTIN ET AL  1,901,218
CONSTANT CURRENT VARIABLE VOLTAGE ELECTRIC GENERATING SYSTEM
Filed July 30, 1931
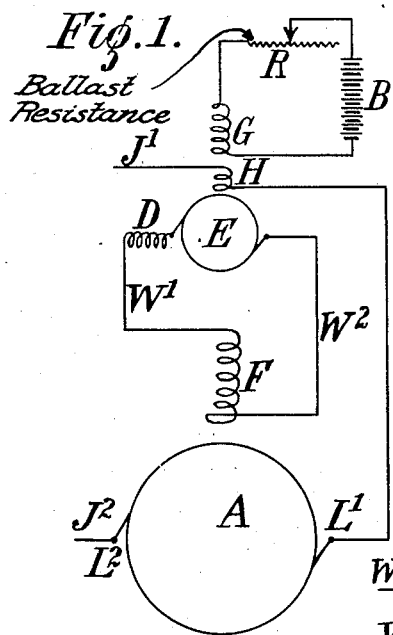
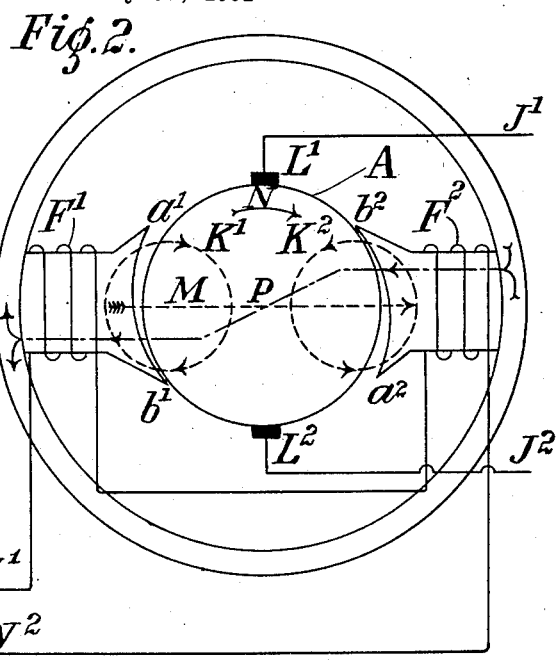
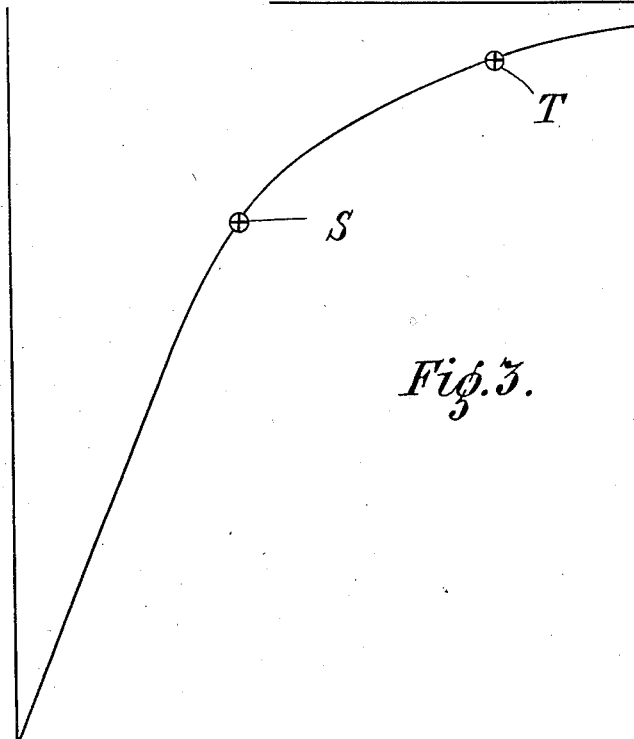

Patented Mar. 14, 1933

1,901,218

UNITED STATES PATENT OFFICE

GILBERT AUSTIN, JAMES COLQUHOUN MACFARLANE, AND WILLIAM ALLAN MACFARLANE, OF GLASGOW, SCOTLAND

CONSTANT CURRENT VARIABLE VOLTAGE ELECTRIC GENERATING SYSTEM

Application filed July 30, 1931, Serial No. 553,956, and in Great Britain November 15, 1930.

This invention relates to constant current-variable voltage electric generating systems, and its chief object is to provide an improved method and apparatus for exciting constant current variable voltage dynamos, whereby the dynamo current is held constant or "rigid" with load variation, and the dynamo field is adapted to change with rapidity in response to sudden changes of load.

In the first place it is desired to direct attention to the differences in operating conditions which exist between a dynamo designed to give constant current with variable voltage, and the more usual type of dynamo designed to give a constant voltage with variable current.

Firstly, the constant voltage dynamo works with a saturated, or nearly saturated, field which is not varied (except to a small extent for regulating purposes) with the load. A dynamo intended to be provided with shunt excitation must in fact have its field system working at or near saturation, for it is this saturation that limits and stabilizes the voltage in a shunt machine. Even in those special cases when the machine must be capable of adjustment throughout a range of voltages (adjustable voltage) and where on the lower voltages the field must work in an unsaturated condition, it is usual to employ special devices such as compound windings, variable air gaps, etc., in order to prevent any variation of the field flux with changes of load. Load variations, therefore, in a constant voltage machine, take place by variations of current, the voltage remaining constant, and since the armature circuit has usually a low time-constant as compared with the field circuit, sudden changes of load (such as switching the load off altogether), can take place without seriously affecting the stability of the system or bringing about transient conditions of current or voltage which might have the effect of causing, for instance, flashing over at the commutator.

On the other hand in a constant current dynamo, since a change of load involves a change of voltage if the current is to remain constant, any change of load simultaneously involves a change of flux in the field magnet system and therefore of the stored energy of that system. Since the time constant of the magnetic field is large compared with that of the armature circuit, sudden changes of load may lead to large variations of the main current owing to the inability of the magnetic field to follow the changes of load quickly enough. This may as a consequence lead to flashing over at the brushes and to undue stress on other parts of the machine, particularly when the load is suddenly reduced.

In our invention we provide an improved means for exciting a constant current generator, whereby the above described objections are eliminated, or very greatly reduced, and thoroughly stable operation is secured.

According to this invention we provide in or for a constant current-variable voltage generating system, the combination with a main constant current dynamo, of an exciter the capacity of which is such that under transient conditions it is capable of giving a voltage at its terminals greatly in excess of that required by the main dynamo field under full load excitation, the limits being from twice to about one hundred times normal voltage, according to the design required, the field excitation of the exciter consisting of, an abutment coil supplied from a separate source of constant voltage and an opposing coil the current in which is either the main constant current or a current strictly proportional thereto, the field system of the exciter being made relatively large in order to enable it to work with a small difference in M. M. F. between the two coils in order to provide "rigidity" of current output and "rapidity" of operation under transient conditions.

Preferably the polar air gaps of the main dynamo are tapered in order to increase the rapidity of the changes of the dynamo field in response to sudden changes in load, also a ballast resistance may be inserted in the circuit of the abutment coil for the purpose hereinafter described.

In order that our invention may be properly understood, we will now describe our invention, by way of example, with reference to the accompanying drawing, whereon:—

Fig. 1 is a diagram showing the connections of a dynamo and exciter in accordance with our invention.

Fig. 2 is a diagram of a machine in accordance with our invention, showing the tapering of the air gap under the main dynamo poles for the purpose to be described later.

Fig. 3 is a saturation curve showing the gain in output to be obtained by allowing the dynamo to work well beyond the knee of the saturation curve instead of confining operation within the unsaturated part of the curve, as is necessary with the usual design of constant current dynamo.

Referring to the drawing:—

A (Fig. 1) is the armature of a constant current dynamo with a field winding F separately excited from the exciter armature E in the circuit W1, W2. G is the exciting coil on the exciter field (hereinafter referred to as the "abutment" coil), this coil being supplied from a separate source of constant voltage which is shown, for convenience, in the diagram as a battery B. The circuit of G also contains a resistance R, the purpose of which will be described later. D is the exciter interpole coil, which in addition to its normal function as an interpole coil, may, as described later, be designed to allow a small amount of adjustment of the voltage over the exciter brushes, proportional to the exciter armature load, either in a positive or negative direction, by shifting the exciter brushes within the range covered by the interpole face. A coil H is connected in series with the main constant current circuit J1 J2 of the dynamo A and arranged to oppose the separately excited abutment coil G. It will be seen that the excitation of the exciter E is provided for by the difference in M. M. F. between the abutment coil G and the series opposing coil H, and this difference between the two coils may be made as small as we please by making the magnetic path in the exciter field and armature of relatively large section and low reluctance so that a large flux is obtained with the small M. M. F.

Now is a constant current-variable voltage dynamo there are two essential points to be taken into consideration, in the design, viz:—
(1) rigidity, (2) rapidity.

By "rigidity" is means the inherent ability of the combination of dynamo and exciter to hold the current at, or near to, a constant value under any variation of load, irrespective of any special compounding coils, saturation, etc., or any similar devices. By "rapidity" is meant the ability of the dynamo to alter its field in response to sudden changes of load, as fast as, or faster than, the load itself can change.

Hitherto the upper limit of useful voltage in a constant current dynamo has been fixed at the point where saturation of the magnetic circuit just commences. This means that with constant current dynamos as hitherto made relative "rigidity" is only obtained by operating the magnetic circuit of the dynamo below saturation and by the use of special compounding devices which results in a large and clumsy main machine.

In our invention, owing to the relatively large capacity of the exciter and to the special construction adopted, the main generator can have its iron parts carried well above the knee of the saturation curve so that the useful voltage range is extended by 30% or more. This is shown in Fig. 3 where S represents the point on the saturation curve beyond which ordinary designs of constant dynamos are never worked, and T represents the extra voltage obtainable with a combination designed under the present invention.

This has a two-fold effect in respect that:—
(1) The main generator is cheapened by such an amount that the saving in cost more than counterbalances the extra cost of the larger exciter employed.
(2) Owing to the smaller amount of material in the magnetic system of the main generator the stored energy is less, and therefore, the generator itself is inherently more rapid in its response to changes of load.

In our invention in so far as it relates to the exciter, the first condition, namely that of "rigidity", is met by making the normal difference in M. M. F. between the coils G and H small relatively to the actual M. M. F. of each coil, and the second condition, that of "rapidity" is met by making the change of this small normal difference very great for small changes of load. In order to keep the self and mutual inductances of the coils G and H as low as possible the exciter magnetic circuit is kept large in section and low in reluctance so that the actual turns of each winding may not be excessive although the flux passing through the exciter armature may be very large. Also, the air gap of the exciter field is made as small as possible, even down to the clearances usually considered necessary in induction motor practice, although for some purposes the poles may be provided with graded air gaps.

This leads to a heavy type of exciter in respect that the magnetic parts are very much larger in section than for a normal design of machine, but as explained above, this is more than counterbalanced by the reduction in cost of the main generator brought about by the use of such a large exciter.

To give an example, suppose that the field F (Fig. 1) is designed to work on full load with a maximum of 10 volts; i. e., 10 volts over F, will give full normal voltage over the generator armature A. Assume that the exciter is so designed that with a difference between G and H of 20 ampere-turns (ATS), the exciter voltage is 10, and further assume that it is desired that with a variation of 1% in the constant current, the exciter voltage will change 100%, then:—

(1) $G-H=20$ ATS.

(2) $G-\dfrac{99}{100}H=40$ ATS (or alternatively)

(2a) $G-\dfrac{101}{100}H=0$ and from formulas 1 and 2, or 1 and 2a we find that H must be 2000 ATS and G must be 2020 ATS for normal full load.

Thus it will be seen that for "rigidity" a change of 1% in current will either double the volts over the field F or wipe them out altogether according to the direction of the change, and as for "rapidity", provided the field of the exciter is fully laminated, a sudden change of 10% in the main current will impress immediately a voltage over the field coils F equal (in the example chosen) to 11 times full normal voltage, thus forcing the field of the main generator to correct the transient change of current with great rapidity. Violent changes of load in the main circuit therefore produce greatly enhanced changes of voltage at the terminals of coil F, forcing the main field to change at a rate equal (at least) to the rate of change of the main armature current notwithstanding the greater inductance of the field coil F. In fact the time constant of the exciter plus generator field, can by this means, be made equal to, or even less than, the time constant of the main circuit which is what is required for stable operation.

In the above example we have assumed that 20 ATS in the exciter field are necessary to generate 10 volts, and this leads to coils G and H having 2020 ATS and 2000 ATS respectively. Should these figures involve in any particular case too many turns in the coils G and H (in view of the mutual inductive effect to be described later) it is possible to reduce the turns on each coil by making the exciter magnetic paths of still larger section and smaller reluctance so as to pass the same flux with fewer ATS. For instance if the iron and air gap sections are increased so that 10 ATS will give 10 volts at the brushes of the exciter then the coils G and H will have, 1010 and 1000 ATS respectively, that is, for the same field currents, G and H will each have half the number of turns required for the first example.

It is essential that the exciter should be rapid in action and that changes of load should affect the exciter in such a way that the voltage at the exciter brushes adjusts itself almost instantaneously to the change of load. Since the coils G and H are on the same field system there will exist an inductive relationship between them and owing to transformer action, any rapid change of flux brought about by a change of current in the coil H will generate a voltage in the coil G tending to oppose the change. This transient voltage will be added to, or subtracted from, the voltage of the constant voltage source B, and will momentarily tend to delay the change of flux in the exciter field. In order to reduce the time constant of the coils G and H the magnetic paths of the exciter are made large in section and low in reluctance, as described above, so as to reduce the number of turns in each coil, but in addition we may enhance the rapidity of action of the exciter field very considerably by making the coil G relatively inefficient by including in the circuit of G a large ballast resistance R so that a considerable proportion (say from $\frac{1}{2}$ to $\frac{9}{10}$) of the constant voltage due to B is absorbed in R. This has a two-fold effect. In the first place, if R absorbs say $\frac{2}{3}$ of the voltage of B, then G will utilize only $\frac{1}{3}$ of the supply voltage (under steady conditions) and consequently the coil G must be made with only $\frac{1}{3}$ of the turns it would otherwise have and consume 3 times the current in order to maintain the same ATS. Under these conditions the power taken for excitation of the coil G from the source B will be 3 times as great as it would be if G was designed to utilize the whole voltage of B, and $\frac{2}{3}$ of this power will be wasted in R, but nevertheless the coil G has now only $\frac{1}{3}$ of the turns it would otherwise have and its inductance is correspondingly reduced. In the second place, owing to the drop of voltage over the resistance R any variation of current in the coil G is quickly damped out because the drop over G is small compared with the drop over R. For example, if the source B is 30 volts, then under the condition given above the resistance R will absorb 20 volts and the coil G, 10 volts. If, however, the current in G should be reduced to half of its steady value owing to some transient load condition, the drop over R will instantaneously fall to 10 volts, leaving 20 volts over G (instead of the normal 10 volts) to overcome the transient transformer voltage which is causing the drop in current.

By these methods, therefore, the field system of the exciter is made extremely rapid and can adjust itself without appreciable delay to extremely rapid variations of the load on the main circuit. It is assumed of course, to get the maximum advantage from these devices, the exciter field is made fully laminated.

A regulating resistance may be included in the circuit of G or the resistance R may be made variable within limits as shown in Fig. 1.

The rapidity of operation of similarly designed constant current dynamos decreases as the size increases, owing to the increased cubic capacity of their magnetic circuits and consequently the stored energy, and this is more particularly the case with large output machines as there are generally of relatively low speed. It will not be practicably possible, therefore to increase the size of the exciter indefinitely, because the rapidity of action of the combination depends on the rapidity of action of each, but more particularly on the exciter. The exciter capacity can be raised considerably, however, in many cases, without increasing its cubic capacity, by gearing it up to run at the maximum practicable speed for a machine of its output; and this arrangement, while it reduces the size of the machine owing to the increased speed, also reduces it owing to the better ventilation obtained.

A transient exciter output capacity equal to the continuous output capacity of the main generator can be realized in many cases by this means, and this is the equivalent in magnetizing effect to an induction motor running on a 50 cycle supply at .7 power factor. In such an induction motor the wattless magnetizing current is equal to the power component of the current and is capable of completely reversing the magnetic field in ½ cycle, that is 1/100 second.

Similar conditions will therefore apply in the D. C. case if the transient exciter capacity is made equal to the continuous capacity of the main machine in respect that the exciter will be capable not only of reducing the main field to zero but of completely reversing it in 1/100 second.

The provision of a large capacity exciter makes it unnecessary to supply a separate compound winding, but in order to make up for any small change of current not provided for by the relatively small difference between the abutment coil G and the opposition coil H we may arrange specially to design the interpole D so as to allow of some latitude in brush position, and displace the exciter brushes by an amount sufficient to get the overcompounding, if any, desired.

Instead of, or in addition to the above arrangement, the following arrangement may be adopted:—

In machines without interpoles, the coil or coils under commutation have a demagnetizing effect owing to the short circuit currents set up in them by the armature cross-magnetizing flux. If the interpoles are overwound so that they not only balance the armature cross M. M. F., but actually reverse it, then the coils short circuited by the brushes will carry short circuit currents which will have a magnetizing effect on the main field, and this effect may be used for compounding.

In order to still further increase the rapidity of action of the main generator itself under sudden changes of load we may arrange to taper the air gaps under the poles as shown in Fig. 2, wherein A is the armature of the main constant current generator, and F1 and F2 the field coils separately excited from the exciter E (Fig. 1) L1, L2 are the brushes and J1, J2 the main constant current circuit, one line of which supplies the coil H (Figure 1).

The field coils F1, F2 produce an excitation in the direction of the arrow M. The direction of rotation is shown by the arrow N, and the direction of the armature M. M. F. in relation to the pole faces is indicated by the circular arrows K1, K2. With full excitation on the poles the armature M. M. F. is added to the field M. M. F. M, at the tips $a1$, $a2$ (where the air gap is largest) but is substracted from the field M. M. F. M, at the tips $b1$, $b2$. With suitable grading of the taper of the air gap this results in a fairly uniform flux over the whole pole face under full load conditions.

On the other hand when the polar M. M. F. M falls to zero the armature M. M. F. K1, K2 sends a flux into the poles at the tips $a2$, $b1$ and out of the poles at the tips $a1$, $b2$. Since the reluctance of the path at $a1$ and $a2$ is greater than the reluctance of the path at $b1$ and $b2$ on account of the greater air gaps at $a1$ and $a2$, and since the armature M. M. F. is approximately equal at all four tips (with brushes in the neutral position), this results in a reverse flux being forced through the armature and field magnets at the tips $b1$, $b2$ as indicated by the chain dotted arrow P. Therefore, for zero load, that is, no voltage over the brushes L1, L2, it follows that the main polar M. M. F. M need not be reduced to zero, but will still have a value equal to about ¼ or ⅕ of its value at full load, when the voltage over the brushes L1, L2 is zero.

It will be evident that not only does the exciter E (Fig. 1) require to operate only on a range of ¾ to ⅘ of the maximum voltage over F (for a change from full load to no load or vice versa), but that at lower excitations the armature reaction of the main generator itself acts in such manner as to assist the exciter in changing the field flux of the main machine with sudden changes of load, the increased armature reaction due to increased load current having the effect of reducing the total flux from the poles of the main machine. Since the armature reaction of the main generator armature, with tapered air gaps as shown on Fig. 2, is equivalent at low excitations to a reverse series coil, the change brought about in this manner is very rapid as the machine approaches zero load. This effect, taken in conjunction with the extremely rapid exciter, is of very great importance in preventing flashing over at the commutator of the main generator, and other possible damage, when the load is suddenly switched off, a condition which occurs frequently in constant current generators of ordinary design. Where the field system of both generator and exciter are fully laminated it will be possible to design constant current dynamos which have the same rapidity characteristics as alternating current induction motors in which the time required to change from full power to zero power is ¼ cycle, equal to 1/200 second on a 50 cycle supply.

This great speed of change from full load to no load will in itself tend to cause a certain amount of sparking due to the breakdown of flux threading the armature coil actually under commutation at the time. Apart from the use of interpoles this tendency to spark at the instant of load change can be eliminated by the use of high resistance commutator connections such as are in common use on A. C. commutator motors.

In the above we have shown that in order to obtain complete "rigidity" and "rapidity" in a constant current, variable voltage dynamo, it is necessary to design the exciter with a relatively large and heavy field system, unsaturated under all conditions of load, and to work with a small difference of M. M. F. between the coils G and H (Fig. 1), and further to keep down the self and mutual induction of the coils G and H by reducing the number of turns as far as possible, this being brought about by reducing the reluctance of the magnetic circuit of the exciter to a minimum and by inserting if necessary a ballast resistance R in the circuit of G, as already described.

When such an exciter is used to excite the field of a constant current generator, the generator can, as explained above, be made smaller than a constant current generator of normal design, because it will be permissible, with the margin allowed on the exciter, to run the magnetic material of the generator well above the knee of the saturation curve as shown at T, Fig. 3, whereas with a constant current dynamo designed on normal lines the maximum saturation allowable would be as shown at point S on Fig. 3.

In operation this gives a machine in accordance with our invention a greater speed of operation at lower loads, this being what is required, because experience has shown that the switching off of a load, or its sudden reduction, is the most dangerous condition owing to the fact that in machines as ordinarily designed the fields cannot change quickly enough, and with reducing load the current tends to increase unduly, causing flashing over and a general disturbance of the system.

Exciters of the size proposed have not, as far as we are aware, hitherto been used in any type of machine and even with small low speed machines (whether D. C. constant voltage or D. C. constant current machines, A. C. alternators or rotary convertors) the excitation power very seldom exceeds 5% of the output power of the main machine even under momentary conditions. In fact for machines of 50 to 60 k. w. output capacity running at normal speeds, the excitations capacity provided would not as a rule exceed 1% to 1½% of the capacity of the main generator.

With our invention, however, the exciter would be of such size as to be capable of giving a transient voltage of from twice up to possibly 100 times (depending on the circumstances of the case) that of an exciter designed on more ordinary lines, although its output under steady conditions may not be any larger than that of a machine designed on more ordinary lines. To give an example:—

Suppose the field F is required for steady maximum voltage to take 50 amperes at 10 volts over its terminals, an exciter of "ordinary" type would be designed to give 10 volts 50 amperes at its full load and would not be capable of appreciably exceeding this output, because the field F forms a resistance load for steady conditions and the only way to increase the current through it would be to increase the voltage. Since exciters as ordinarily designed are worked with the magnetic material well over the knee of the saturation curve, this means that an increase of voltage of more than 25% is in most cases not attainable. In the case of a machine according to our invention the exciter would be a large undersaturated machine working normally at a load very much under its maximum and capable under abnormal conditions of developing a voltage which may be (as the particular case may require) anything from 20 to 1000 volts. The latter case would be an extreme case and would only be required in the case of very difficult circuits. Usually the maximum transient voltage of such an exciter will not exceed 5 to 20 times its maximum steady voltage.

With this invention, then, the combination of a constant current generator, of smaller size than usual, with an exciter of considerably greater transient capacity than usual and designed on the lines set forth in the foregoing description, the greater size of the exciter combined with the method of winding and construction set forth enables the size of the main generator to be reduced by an amount sufficient to balance (or more than balance) the cost of the larger exciter, while at the same time all the advantages of rigidity and rapidity of operation hereinbefore described are obtained, this rigidity and rapidity being further enhanced by the methods further described, namely the use of a large ballast resistance in the circuit of the coil G and the use of graded air gaps in the main machine as described with reference to Fig. 2.

It will be found that if a design is properly carried out following the lines laid down in this specification, then:—

(1) The cost of the combination of exciter and dynamo is not greater than, and may be less than, that of a combination designed on normal lines.

(2) The efficiency of the combination is as high as, or higher than, that of a normally designed combination, notwithstanding the greater size of the exciter and the use of the ballast resistance R, largely because of the greater efficiency obtainable from the main generator itself owing to the reduction of material therein.

(3) The "rigidity" and "rapidity" of the combination are enhanced to such an extent that a practicable constant current-variable voltage generator can be designed capable of working with the same (or greater) stability and freedom from commutator troubles, that characterize a well designed constant voltage machine.

The use of graded air gaps is already known for improving the commutation and increasing the load efficiency of constant voltage generators.

I claim:—

1. In or for a constant current-variable voltage generating system, the combination with a main constant current dynamo of size smaller than the normal for the required output, of an exciter the capacity of which is such that under transient conditions it is capable of giving a voltage at its terminals several times (the limits being from twice to about 100 times, in accordance with the design required) higher than that requred from the exciter by the main dynamo field under full load excitation, the field excitation of the exciter consisting of an abutment coil supplied from a separate source of constant voltage and an opposing coil the current in which is either the main constant current or a current strictly proportional thereto, the magnet system of the exciter being made of extremely low reluctance in order to enable it to work with a small difference in M. M. F. between the two coils for the purpose of providing "rigidity" of current output, and having a small number of ampere turns in each coil for the purpose of obtaining "rapidity" of operation under transient conditions, the number of ampere turns in each coil being as small as possible concomitantly with the desired voltage and low reluctance of the exciter.

2. Apparatus as claimed in claim 1, in which the current in the opposing coil consists of the armature current of the main dynamo itself.

3. In a constant current-variable voltage electric generating system, the combination with a main constant current dynamo, of an exciter the capacity of which enables it, under transient conditions, to give a voltage at its terminals greatly in excess of that required by the main dynamo field under full load excitation, the limits being from twice to about one hundred times normal voltage according to the design required, the field excitation of the exciter consisting of, an abutment coil supplied from a separate source of constant voltage, and an opposing coil the current in which is proportional to the main constant current, the field system of the exciter being made relatively large in order to enable it to work with a small difference in M. M. F. between the two coils in order to provide "rigidity" of current output and "rapidity" of operation under transient conditions, and a ballast resistance in the circuit of the abutment coil capable of absorbing a considerable proportion of the voltage from the constant voltage source.

4. In a constant curent-variable voltage electric generating system, the combination with a main constant current dynamo, of an exciter the capacity of which enables it, under transient conditions, to give a voltage at its terminals greatly in excess of that required by the main dynamo field under full load excitation, the limits being from twice to about one hundred times normal voltage according to the design required, the field excitation of the exciter consisting of, an abutment coil supplied from a separate source of constant voltage, and an opposing coil the curent in which is proportional to the main constant current, the field system of the exciter being made relatively large in order to enable it to work with a small difference in M. M. F. between the two coils in order to provide "rigidity" of curent output and "rapidity" of operation under transient conditions, a ballast resistance in the circuit of the abutment coil capable of absorbing a considerable proportion of the voltage from the constant voltage source, interpoles on the exciter designed and adapted in addition to their normal function of improving the commutation, to give an over-compounding effect on the voltage of the exciter by shifting the brushes within the range of the interpole face.

5. Apparatus as claimed in claim 4, in which the over-compounding effect of the interpoles is obtained by over-winding the same.

6. In or for a constant current-variable voltage electric generating system, a main constant current dynamo having tapering polar air gaps for increasing the "rapidity" of operation, in combination with, an exciter the capacty of which enables it to give, under transient conditions a voltage at its terminals greatly in excess of that required by the main dynamo field under full load excitation within limits from twice to about one hundred times normal voltage according to the design required, the field excitation of the exciter consisting of, an abutment coil supplied from a separate source of constant but adjustable voltage, and an opposing coil carrying the current of said main constant current dynamo, the field system of the exciter being relatively large in order to enable it to work with a small difference in M. M. F. between the two coils.

7. In or for a constant current variable voltage electric generating system having a main constant current dynamo, an exciter capable of giving a voltage several times (the limits being from twice to about 100 times) higher than that required from the exciter by the field of said main dynamo under full load excitation, the field excitation of the exciter being provided by an abutment coil adapted to be energized from a constant voltage source and an opposing coil opposing said abutment coil and adapted to be energized by the armature current of said main dynamo or by a current strictly proportional thereto, the magnet system of the exciter being made of extremely low reluctance to enable it to work with a small difference in M. M. F. between the two coils, for the purpose of obtaining "rigidity" of current output, and having a small number of ampere turns in each coil for the purpose of obtaining "rapidity" of operation under transient conditions, the number of ampere turns in each coil being made as small as possible concomitantly with the desired voltage and low reluctance of the exciter.

In testimony whereof we affix our signatures.

GILBERT AUSTIN.
JAMES COLQUHOUN MACFARLANE.
WILLIAM ALLAN MACFARLANE.